Dec. 19, 1944. G. F. HAUSHERR 2,365,547
STEREOSCOPIC DEVICE
Filed June 10, 1941 2 Sheets-Sheet 1

INVENTOR
George F. Hausherr
BY
Munn, Liddy, Glaccum & Kane
ATTORNEYS

WITNESSES

Dec. 19, 1944.   G. F. HAUSHERR   2,365,547
STEREOSCOPIC DEVICE
Filed June 10, 1941   2 Sheets-Sheet 2
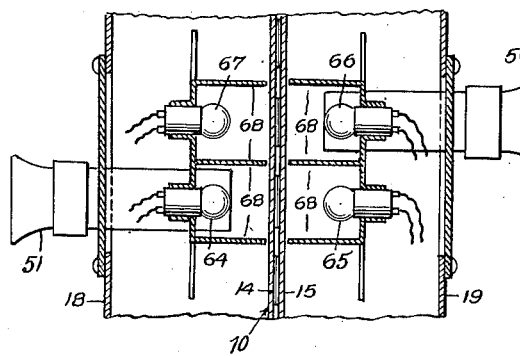
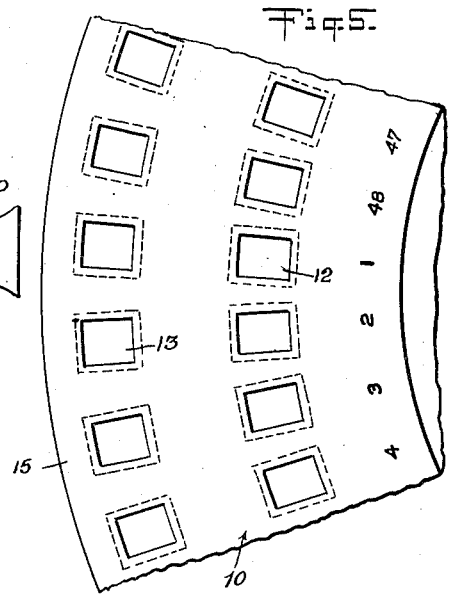
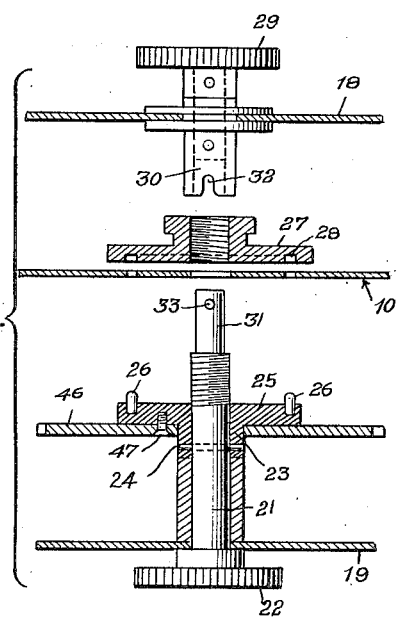
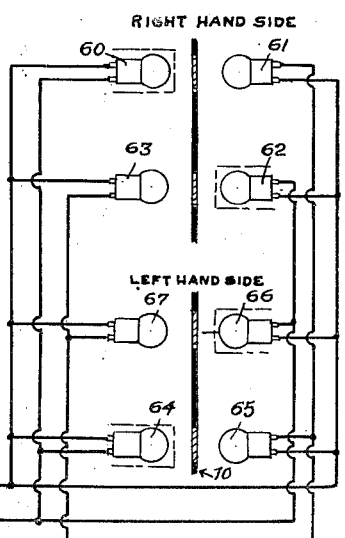
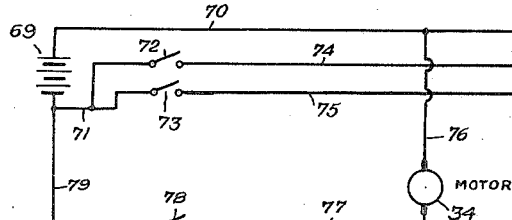
INVENTOR
*George F. Hausherr*
BY
*Munn, Liddy, Glaccum & Kane*
ATTORNEYS
WITNESSES Patented Dec. 19, 1944

2,365,547

UNITED STATES PATENT OFFICE 2,365,547

STEREOSCOPIC DEVICE

George F. Hausherr, Lynbrook, N. Y.

Application June 10, 1941, Serial No. 397,363

4 Claims. (Cl. 88—31)

This invention relates to an improved stereoscopic device to be used for displaying and viewing stereoscopic pictures.

It is an object of the invention to provide a stereoscopic device having an improved stereoscopic mounting for supporting a plurality of stereoscopic pictures which may be successively viewed by one or more persons.

A further object of the invention is the provision of an improved stereoscopic device which is of compact construction, which is convenient to handle, and which may be used in many different associations where it is desired to display stereoscopic pictures such as, for instance, in connection with advertising and merchandising work, or for purposes of amusement, instruction or education.

In the accompanying drawings—

Fig. 4 is a detail sectional view showing one form of lighting arrangement which may be used in my device;

Fig. 5 is an enlarged detail of a portion of the disc which is used as a mounting for the stereoscopic pictures;

Fig. 6 is an enlarged sectional view of the central portion of the disc and casing, and of the shaft used in supporting the disc; and Fig. 7 is a diagram of the electric circuits which may be employed.

Figure 1:
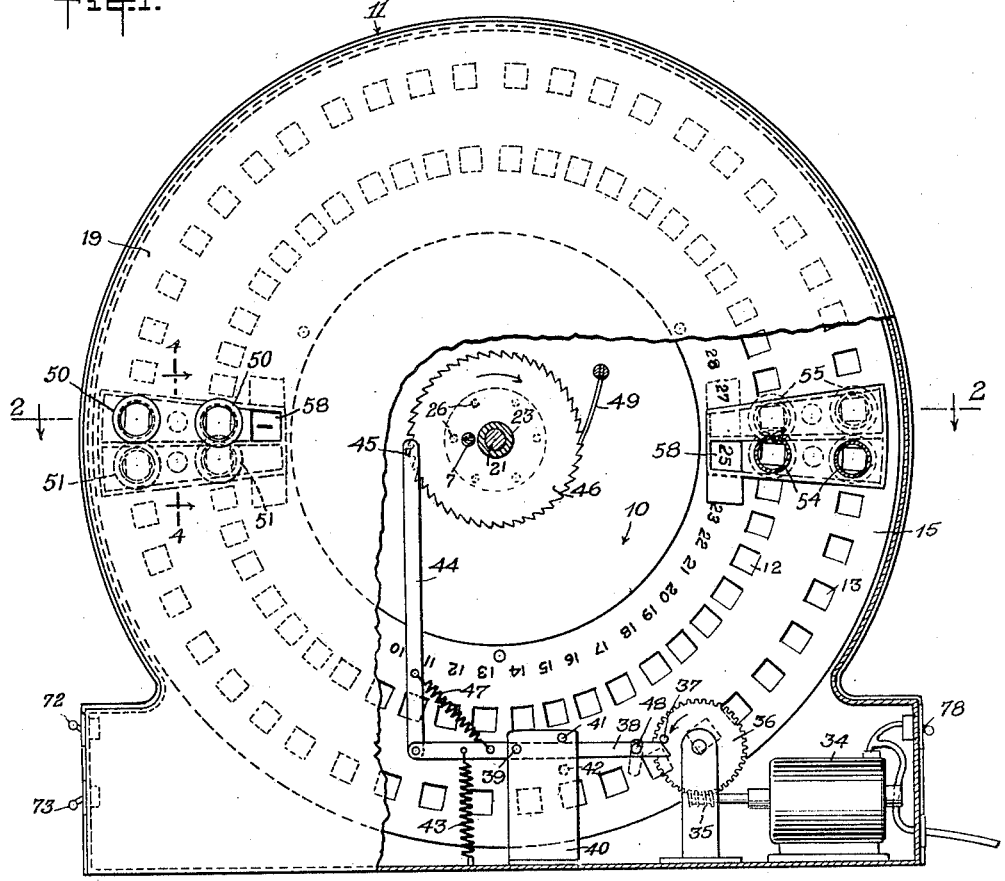
Fig. 1 is a partially fragmentary front elevational view of a stereoscopic device embodying my invention.

My stereoscopic device comprises an improved mounting 10 for the stereoscopic pictures, which is suitably supported in the casing 11 in such a manner that the stereoscopic pictures may be successively displayed.

My improved mounting is preferably in the form of a flat circular disc, as shown, and the stereoscopic pictures are arranged on the disc in two concentric circular series, or rows, as indicated at 12 and 13. Each picture from one of the series is arranged in a pair, with the corresponding picture of the other series, and the several pairs are preferably disposed in a radial line on the disc, as shown. The pictures in one of the series represent one of the stereoscopic views of the various scenes depicted, while the pictures in the other series represent the other stereoscopic views of the corresponding scenes. Thus, when the two pictures in each pair are viewed by the respective eyes of the person using the device, he will see a stereoscopic or three-dimensional image.

The stereoscopic pictures may be either transparent or opaque, and may be held in position by many different expedients. One means for holding the pictures in position is illustrated in the accompanying drawings where it will be seen that the outer portion of the disc is illustrated as being formed of two spaced layers or walls 14 and 15, having display windows or apertures formed therein to display the pictures. The pictures are disposed between the two walls in the fashion shown, so that they may be viewed through the window or apertures. In this connection, an adhesive may be employed, if desired, to hold the pictures in position. Where the pictures employed are transparencies, it will be seen that they may be viewed from either side of the mounting. Where the pictures are opaque, they may be viewed from one side of the mounting only, or, if desired, corresponding pictures may be displayed on both sides of the mounting.

The stereoscopic pictures may be displayed to view through any desired type of stereoscopic viewer. One convenient manner of displaying the pictures is to mount the disc 10 in a suitable casing 11 which may be formed of two shallow cup-like sections 18 and 19, fitted together around their edges, in the manner shown at 20. The disc 10 is suitably supported in the casing as, for instance, by means of the shaft 21, extending through a centrally formed aperture in the disc, and provided with a handle 22 projecting outwardly from the outside of the casing, and by means of which the disc may be rotated. The disc is suitably connected to the shaft 21 so as to rotate therewith, but so as to be removable so that it can be replaced by another disc if desired.

One satisfactory mechanism for connecting the disc to the shaft comprises the sleeve 23, disposed around the shaft and keyed thereto by the pin 24. The sleeve is formed integrally with a collar 25 which in turn is provided with outwardly projecting lugs 26, adapted to extend through apertures formed in the disc 10. To hold the disc in position on the shaft, I provide a threaded collar 27 which engages with the threaded end of shaft 21 and which is provided with a circular groove 28 to accommodate the lugs 26 in the manner shown. In order that the disc may be manually rotated from either side of the casing, I provide another handle 29 projecting from the opposite side of the casing and formed with a small shaft projecting through the casing, having a tubular sleeve 30 adapted to frictionally engage the reduced shank 31 of the shaft 21. The sleeve is preferably provided with slots 32 for accommodating the studs 33 so that the two shafts will be keyed together and will be caused to rotate simultaneously.

Figure 2:
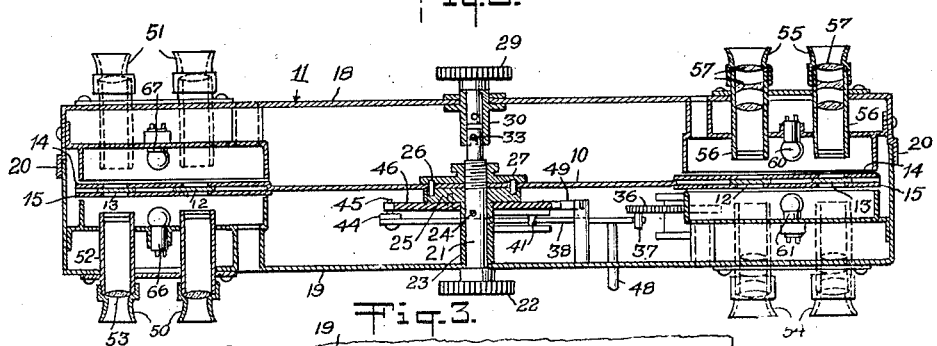
Fig. 2 is a cross sectional view on the line 2—2 of Fig. 1.
Figure 3:
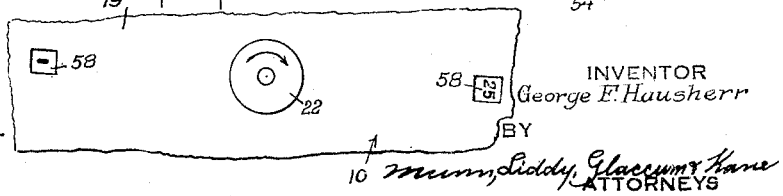
Fig. 3 is a detail view of a portion of the device showing the handle which may be used for manually controlling the stereoscopic picture or pictures which are being displayed, and also showing the indicator which gives a clear visual indication of the picture being displayed.

In order to cause the pictures to be successively displayed, I have found that it is sometimes desirable to provide motor-driven means to cause the intermittent rotation of the disc, and this mechanism is most clearly shown in Figs. 1 and 2. For this purpose I preferably provide an electric motor 34, connected by speed reduction gearing, such as worm 35, to the pinion or gear 36. On one side the pinion or gear 36 is provided with a projecting stud 37 which, upon each rotation of the pinion, engages and trips the lever 38 which is pivotally mounted at 39 upon a suitable supporting standard 40. The movement of the lever 38 is confined within predetermined limits by the two pins 41 and 42 projecting inwardly above and below the lever from the standard 40. A spring 43 connected between the left-hand end of lever 38, as viewed in Fig. 1, and the base of the casing serves normally to hold the lever in engagement with the pin 41. Upon rotation of the pinion 36, the stud engages the angularly disposed end of the lever 38 with the result that it is tripped or shifted against the tension of spring 43 into engagement with pin 42. When stud 37 passes beyond lever 38, spring 43 will return the lever to the position indicated in Fig. 1.

The left-hand end of lever 38, as viewed in Figs. 1 and 2, is pivotally connected to the end of a link 44, which is provided at its opposite end with a stud or pin 45 in engagement with the teeth of ratchet 46. The pin or stud 45 is held in engagement with the teeth of the ratchet by means of spring 47. Thus it will be seen that when motor 34 is in operation, an intermittent rotating motion is imparted to ratchet 46 by means of worm 35, pinion 36, lever 38 and link 44. Since ratchet 46 is connected to collar 25 by means of the set screw 7, the intermittent motion is transmitted to the disc 10. The mechanism is so arranged that upon each revolution of pinion 36, disc 10 is rotated a sufficient distance to cause the next or succeeding pair of stereoscopic pictures to be displayed. The speed of the motor and the relative size of the parts should be so arranged that the disc 10 is permitted to remain stationary a sufficient length of time between successive intermittent motions to permit the stereoscopic pictures to be viewed by the user of the device.

In addition to the motor 34, I also provide manual means in the form of handle 48, connected to the lever 38 and projecting outwardly through the casing 11, whereby an intermittent motion may be imparted to the disc 10. In order to prevent accidental retrograde motion of the disc, I provide a spring pawl 49 in engagement with the teeth of the ratchet 46.

To permit viewing of the stereoscopic pictures, I provide one or more pairs of eyepieces in the casing, positioned so that each pair of eyepieces may be brought into registry with a pair of the stereoscopic pictures on the mounting. In the illustrated embodiment of my invention I have shown four pairs of eyepieces, two on the left-hand side of the device, and two on the right-hand side. One pair, indicated by the numeral 50, are positioned on the front of the casing on the left-hand side, while another pair, indicated by the numeral 51, are positioned on the back of the casing on the left-hand side with offset relationship with respect to the first pair as shown most clearly in Fig. 1, so that different pictures will be viewed by each pair of viewers. The pictures are in upright position when disposed on the left-hand side of the device, as viewed in Fig. 1, and accordingly each of the eyepieces is of conventional construction, consisting of a tube 52 having a lens 53 mounted therein. On the right-hand side of the device I also provide a pair of eyepieces 54 at the front, and another pair 55 at the back, in offset relationship with respect to each other. When the stereoscopic pictures are disposed at the right-hand side of the device, they are in inverted relationship, and accordingly the tubes 56 are provided with an inverting lens system 57 for inverting the image.

Under the arrangement illustrated, it will be seen that the two pairs of eyepieces on the left-hand side of the device communicate with adjacent pairs of stereoscopic pictures, and the two pairs of eyepieces on the right-hand side similarly communicate with adjacent pairs of stereoscopic pictures located on the opposite side of the disc from those communicating with the first pairs of eyepieces.

In order to readily identify the pictures which are being displayed through the several viewers, I provide small window openings 58 in the casing adjacent each pair of eyepieces, and the disc 10 is provided with suitable indicia such as numerals for identifying the picture being displayed. In the device illustrated in the accompanying drawings, there are 48 pairs of stereoscopic pictures, and accordingly the numerals 1 to 48, inclusive, are arranged on the disc opposite the pictures so as to be displayed through the window openings 58.

In order to view the pictures through the eyepieces, adequate light must be provided, and for this purpose the casing may be provided with ground glass opposite each eyepiece to admit light from an outside light source. However, I have found that satisfactory results can be obtained by means of artificial lighting disposed inside the casing. Thus, for the eyepieces 55, I have provided a pair of bulbs 60 and 61, positioned in a plane between the eyepieces, bulb 60 being on the same side of the disc 10 as the eyepieces, and the bulb 61 being on the opposite side of the disc. Similarly, for the eyepieces 54, 51 and 50, I have provided bulbs 62, 64 and 66 on the same side of the disc 10 as the respective eyepieces, and the bulbs 63, 65 and 67 on the opposite side of the disc. So as to confine the light from each bulb to the area of the pictures viewed from the respective eyepieces, I preferably provide a housing 68 having a series of partitions above and below each of the eyepieces on opposite sides of the disc, as most clearly shown in Fig. 4, and which may be supported from the casing, as shown in Fig. 2. The housing is provided with supports for the bulbs and with apertures to accommodate the eyepieces.

Where transparent pictures are displayed in my device, the bulbs on the opposite side of the disc from the eyepieces should be illuminated. Where opaque pictures are displayed, the bulbs on the same side of the disc as the eyepieces should be illuminated. The circuit whereby the lights may be controlled is indicated in Fig. 7. The numeral 69 indicates a battery, one side of which is connected by a lead 70 to each of the bulbs. The other side of the battery is connected by a lead 71 to switches 72 and 73. Switch 72 is connected by lead 74 to bulbs 60, 62, 64 and 66, whereas switch 73 is connected by lead 75 to bulbs 61, 63, 65 and 67. Thus, when opaque pictures are being displayed, switch 72 should be closed, and when transparent pictures are being displayed, switch 73 should be closed. The circuit of motor 34 for intermittently driving the disc, is also indicated in Fig. 7. It will be seen that one side of the motor is connected by leads 70 and 76 to battery 69, and the other side of the motor is connected by a lead 77, switch 78 and a lead 79 to the battery.

In using my device either transparent or opaque stereoscopic pictures are mounted on the disc in two concentric rows, 12 and 13, as shown, with one picture of each series arranged in pairs, with a picture of the other series. The pictures in each pair consist of stereoscopic views of the same scene. When the disc has been prepared in this fashion, it may be inserted in the casing by supporting it on the shaft 21 in the manner heretofore described. The several pairs of stereoscopic pictures can then be successively viewed through any one of the pairs of eyepieces. An intermittent motion can be imparted to the disc so as to successively display the pictures, either by means of the motor 34, or by means of the handle 48. The user of the device can readily determine which picture he is viewing by means of the numeral displayed through the window 58, positioned next to the eyepieces. If he wishes to see a particular picture without waiting for the intermittent rotation of the disc to bring the picture into registry with his eyepiece, he can rotate the disc by means of one of the handles 22 or 29.

It should be understood that many modifications may be made in the illustrated and described embodiment of my invention, such as changing the manner in which the pictures are mounted on the disc and varying the casing construction and the arrangement of the eyepieces. Also two stereoscopic view or images of the same scene are sometimes formed on the same film or on the same print, and the use of such prints or films is within the purview of the present invention, and the word "picture" when used herein shall apply to one of the views or images and not to the entire print or film.

I claim:

1. A stereoscopic viewing device comprising a casing, a mounting for stereoscopic pictures consisting of a disc pivotally mounted at the center thereof in the casing, means for rotating the disc, two series of stereoscopic pictures arranged in concentric circular rows on the disc, the pictures of one series being arranged in pairs with the pictures of the other series, and the pictures in each pair consisting of stereoscopic views of the same scene, and a pair of eyepieces mounted adjacent one side of the casing for viewing stereoscopic pictures mounted at one side of the center of the disc.

2. A stereoscopic viewing device comprising a casing, a mounting for stereoscopic pictures consisting of a disc pivotally mounted at the center thereof in the casing, means for rotating the disc, two series of stereoscopic pictures arranged in concentric circular rows on the disc, the pictures of one series being arranged in pairs with the pictures of the other series and the pictures in each pair consisting of stereoscopic views of the same scene, and two pairs of eyepieces mounted adjacent opposite sides of the casing for viewing stereoscopic pictures on opposite sides of the disc, one of the pairs of eyepieces being provided with an inverting lens system.

3. A stereoscopic viewing device as set forth in claim 1 in which the means for rotating the disc comprises mechanism for causing the intermittent rotation of the disc whereby successive pairs of stereoscopic pictures are sequentially displayed through the eyepieces.

4. A stereoscopic viewing device as set forth in claim 1 in which the means for rotating the disc comprises a motor and mechanism connecting the motor with the disc to cause its intermittent rotation whereby successive pairs of stereoscopic pictures are sequentially displayed through the eyepieces.

GEORGE F. HAUSHERR.